(12) United States Patent
Feuerstack et al.

(10) Patent No.: US 9,331,515 B2
(45) Date of Patent: *May 3, 2016

(54) SYSTEM FOR CHARGING AN ENERGY STORE, AND METHOD FOR OPERATING THE CHARGING SYSTEM

(75) Inventors: Peter Feuerstack, Ludwigsburg (DE); Erik Weissenborn, Stuttgart (DE); Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 323 days.

This patent is subject to a terminal disclaimer.

(21) Appl. No.: 13/984,555

(22) PCT Filed: Dec. 29, 2011

(86) PCT No.: PCT/EP2011/074225
§ 371 (c)(1),
(2), (4) Date: Aug. 9, 2013

(87) PCT Pub. No.: WO2012/107149
PCT Pub. Date: Aug. 16, 2012

(65) Prior Publication Data
US 2013/0314046 A1 Nov. 28, 2013

(30) Foreign Application Priority Data
Feb. 9, 2011 (DE) .......................... 10 2011 003 861

(51) Int. Cl.
| | |
|---|---|
| *H02J 7/00* | (2006.01) |
| *H02J 7/02* | (2016.01) |
| *B60L 11/18* | (2006.01) |
| *H02J 7/14* | (2006.01) |
| H02M 7/483 | (2007.01) |
| H02P 27/06 | (2006.01) |

(52) U.S. Cl.
CPC ............... *H02J 7/02* (2013.01); *B60L 11/1814* (2013.01); *H02J 7/0024* (2013.01); *H02J 7/0065* (2013.01);

(Continued)

(58) Field of Classification Search
USPC .......................................................... 320/116
See application file for complete search history.

(56) References Cited

U.S. PATENT DOCUMENTS

| | | | | |
|---|---|---|---|---|
| 5,811,890 A | * | 9/1998 | Hamamoto | ........ G01R 31/3648 307/66 |
| 6,023,109 A | * | 2/2000 | Yang | ..................... H02J 7/0024 307/63 |

(Continued)

FOREIGN PATENT DOCUMENTS

| | | |
|---|---|---|
| CN | 1407683 | 4/2003 |
| DE | 3345736 | 6/1985 |

(Continued)

OTHER PUBLICATIONS

International Search Report for Application No. PCT/EP2011/074225 dated May 8, 2012 (2 pages).

*Primary Examiner* — Mohammed Alam
(74) *Attorney, Agent, or Firm* — Michael Best & Friedrich LLP

(57) ABSTRACT

The invention relates to a system for charging at least one energy storing cell (5) in a controllable energy store (2) that is used to control and supply electric energy to an n-phase electric machine (1), wherein n ≥ 1. The controllable energy store (2) has n parallel energy supply branches (3-1, 3-2, 3-3), each of which has at least two serially connected energy storing modules (4), each said energy storing module comprising at least one electric energy storing cell (5) with a corresponding controllable coupling unit (6). The energy supply branches (3-1, 3-2, 3-3) can be connected to a reference bus (T-), and each energy supply branch can be connected to a phase (U, V, W) of the electric machine (1). The coupling units (6) bridge the respective corresponding energy storing cells (5) or connect same into the respective energy supply branch (3-1, 3-2; 3-3) dependent on control signals. The aim of the invention is to allow at least one energy storing cell (5) to be charged. This is achieved in that a neutral point (S) of the electric machine (1) and the reference bus (T-) can be connected to a secondary side (9) of a charging transformer (10).

2 Claims, 1 Drawing Sheet

(52) U.S. Cl.
CPC ....... *H02J 7/1492* (2013.01); *H02J 2007/0059* (2013.01); *H02J 2007/0067* (2013.01); *H02M 2007/4835* (2013.01); *H02P 27/06* (2013.01); *Y02T 10/642* (2013.01); *Y02T 10/7005* (2013.01); *Y02T 10/7055* (2013.01); *Y02T 10/92* (2013.01); *Y02T 90/127* (2013.01); *Y02T 90/14* (2013.01)

(56) References Cited

U.S. PATENT DOCUMENTS

| | | | | |
|---|---|---|---|---|
| 2006/0087283 | A1* | 4/2006 | Phillips | B25F 5/00 320/114 |
| 2010/0007319 | A1* | 1/2010 | Manabe | B60L 11/1887 323/285 |
| 2013/0314045 | A1* | 11/2013 | Feuerstack | H02J 7/0024 320/116 |

FOREIGN PATENT DOCUMENTS

| | | |
|---|---|---|
| DE | 102010027857 | 10/2011 |
| DE | 102010027861 | 10/2011 |
| EP | 0907238 | 4/1999 |
| JP | S61236373 | 10/1986 |
| JP | S6395856 | 4/1988 |
| JP | H0370472 | 3/1991 |

* cited by examiner

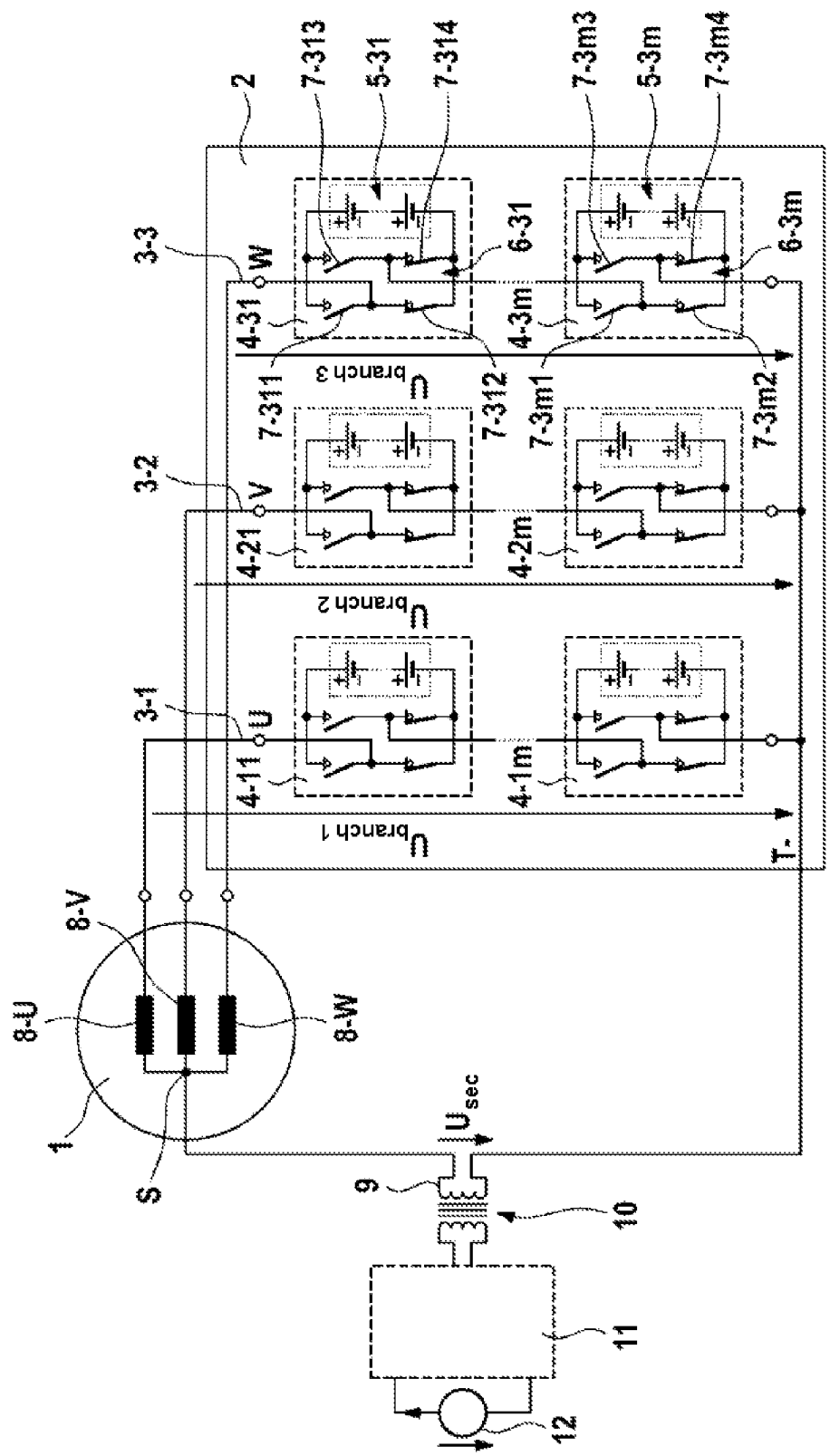

SYSTEM FOR CHARGING AN ENERGY STORE, AND METHOD FOR OPERATING THE CHARGING SYSTEM

BACKGROUND OF THE INVENTION

The invention relates to a system for charging an energy store and to a method for operating the charging system of the invention.

The trend is that in the future electronic systems which combine new energy store technologies with electrical drive technology will be used increasingly both in stationary applications, such as wind power plants, and in vehicles, such as hybrid or electric vehicles. In conventional applications, an electrical machine which is in the form of a polyphase machine, for example, is controlled via a converter in the form of an inverter. A characteristic feature of such systems is a so-called DC voltage intermediate circuit, via which an energy store, generally a battery, is connected to the DC voltage side of the inverter. In order to be able to meet the requirements for a respective application placed on power and energy, a plurality of battery cells are connected in series. Since the current provided by such an energy store needs to flow through all of the battery cells and a battery cell can only conduct a limited current, battery cells are often additionally connected in parallel in order to increase the maximum current.

A series circuit comprising a plurality of battery cells entails the problem, in addition to a high total voltage, that the entire energy store fails when a single battery cell fails because no battery current can flow any more. Such a failure of the energy store can result in failure of the entire system. In the case of a vehicle, a failure of the drive battery can render the vehicle "unusable". In other applications such as the rotor blade adjustment of wind power plants, for example, hazardous situations may even arise in the event of unfavorable boundary conditions, such as a strong wind, for example. Therefore, a high degree of reliability of the energy store is always desired, whereby "reliability" is intended to mean the capacity of a system to operate fault-free for a predetermined time.

In the earlier applications DE 10 2010 027857 and DE 10 2010 027861, batteries having a plurality of battery module strings have been described which can be connected directly to an electrical machine. In this case, the battery module strings have a plurality of series-connected battery modules, wherein each battery module has at least one battery cell and an associated controllable coupling unit, which makes it possible, depending on control signals, to interrupt the respective battery module string or to bypass the respectively associated at least one battery cell or to connect the respectively associated at least one battery cell into the respective battery module string. By suitably actuating the coupling units, for example with the aid of pulse-width modulation, it is also possible for suitable phase signals for controlling the electrical machine to be provided, with the result that a separate pulse-controlled inverter is not required. The pulse-controlled inverter required for controlling the electrical machine is therefore integrated in the battery, so to speak. For the purposes of the disclosure, these two earlier applications are incorporated in full in the present application.

SUMMARY OF THE INVENTION

The present invention provides a system for charging at least one energy storage cell in a controllable energy store which is used to control and supply electrical energy to an n phase electrical machine, where $n \geq 1$. In this case, the controllable energy store has n parallel energy supply branches, which have in each case at least two energy storage modules, which are connected in series and comprise in each case at least one electrical energy storage cell having an associated controllable coupling unit. The energy storage modules can be connected on one side to a reference rail and on the other side to in each case one phase of the electrical machine. The coupling units are configured in this case as full-bridges. Depending on control signals, the coupling units bypass the respectively associated energy storage cells or they connect the respectively associated energy storage cells into the respective energy supply branch. A star point of the electrical machine at one end and the reference rail at the other can be connected to a secondary side of a charging transformer.

The invention also provides a method for operating a charging system of the invention, in which, in a current increase stage in the energy supply branches, a voltage which is smaller in terms of magnitude than that at the secondary side of the charging transformer is set and, in a current reduction stage following the current increase stage in the energy supply branches, a voltage which is greater in terms of magnitude than that at the secondary side of the charging transformer is set.

If the energy storage cells of the controllable energy store are to be charged via a charging transformer, the AC voltage present at the secondary side (secondary winding) of a charging transformer must first be rectified. The invention is based on the basic concept of using the switching elements of the coupling units configured as a full bridge to rectify the secondary-side AC voltage of the charging transformer. For this purpose, the secondary side of the charging transformer is connected to the energy supply branches of the controllable energy store via in each case one charging inductance. In this case, the connection is made indirectly via the star point of the electrical machine, wherein the stator windings of the electrical machine serve as charging inductances. The voltage at the charging inductance results as the difference between a secondary voltage at the secondary side of the charging transformer and the voltage at the controllable energy store. The rectifier function is now realized by the energy storage cells in each case being connected into the respective energy supply branch with that polarity such that they are charged. In this case, in a current increase stage in the energy supply branches, a voltage which is smaller in terms of magnitude than that at the secondary side of the charging transformer is set, with the result that energy is supplied to the charging inductances and stored there. In a current reduction stage following the current increase stage in the energy supply branches, a voltage which is greater in terms of magnitude than that at the secondary side of the charging transformer is set, as a result of which the charging current as a whole is limited. In this case, the voltage in the energy supply branches is determined in each case by the number of energy storage cells connected into the respective energy supply branch. In this way, a constant charging current results during both stages, that is, the current increase stage and the current reduction stage.

The elimination of a separate rectifier unit on the secondary side of the charging transformer leads to savings both in terms of cost and of installation space. Some switched-mode power supply topologies, for instance a so-called "dual active bridge", likewise require a controllable full bridge on the secondary side of a transformer. Switched-mode power supply topologies of this type can likewise be realized with the aid of the arrangement according to the invention.

If the inductances of the stator windings of the electrical machine are insufficient when the secondary side of the charging transformer is connected via the star point of the electrical machine, an additional charging inductance can be connected between the secondary side of the charging transformer and the electrical machine.

Undesired moments during the charging process can be avoided by the electrical machine being mechanically blocked during the charging process, for example using a transmission pawl. Alternatively, the rotor position of the electrical machine can also be monitored, for example using an appropriate sensor system, and can be disconnected in the event of a detected rotor movement.

The charging system of the invention is designed to be galvanically isolated and can also be designed as inductive charging devices, that is to say that all of the components from the mains inlet up until the primary winding can be located in an off-board charging device and the transformer can be appropriately modified, that is to say designed to be planar. When it is used in a vehicle, it results in the advantage that, other than the secondary winding of the charging transformer, no additional components for realizing the charging function must be carried in the vehicle.

Further features and advantages of embodiments of the invention result from the following description with reference to the attached figure.

BRIEF DESCRIPTION OF THE DRAWING

FIG. 1 is a schematic illustration of an embodiment of a charging system of the invention.

DETAILED DESCRIPTION

FIG. 1 shows an embodiment in schematic form of a charging system of the invention. A controllable energy store 2 is connected to a three-phase electrical machine 1. The controllable energy store 2 comprises three energy supply branches 3-1, 3-2 and 3-3, which are connected on one side to a reference potential T- (reference rail), which supplies a low potential in the illustrated embodiments, and on the other side in each case to individual phases U, V and W of the electrical machine 1. Each of the energy supply branches 3-1, 3-2 and 3-3 have m series-connected energy storage modules 4-11 to 4-1m or 4-21 to 4-2m or 4-31 to 4-3m, where m ≥2. In turn, the energy storage modules 4 comprise in each case a plurality of series-connected electrical energy storage cells, which, for reasons of clarity, are only provided with reference signs 5-31 to 5-3m in the energy supply branch 3-3 connected to the phase W of the electrical machine 1. Furthermore, the energy storage modules 4 comprise in each case one coupling unit, which is associated with the energy storage cells 5 of the respective energy storage module 4. For reasons of clarity, the coupling units are also only provided with reference signs 6-31 to 6-3m in the energy supply branch 3-3. In the illustrated variant embodiments, the coupling units 6 are in each case formed from four controllable switching elements 7-311, 7-312, 7-313 and 7-314 to 7-3m1, 7-3m2, 7-3m3 and 7-3m4, which are interconnected in the form of a full bridge. In this case, the switching elements can be designed as power semiconductor switches, for example in the form of IGBTs (insulated gate bipolar transistors) or as MOSFETs (metal oxide semiconductor field-effect transistors).

The coupling units 6 make it possible to interrupt the respective energy supply branch 3 by opening all of the switching elements 7 of a coupling unit 6. Alternatively, by closing in each case two of the switching elements 7 of a coupling unit 6, the energy storage cells 5 can either be bypassed, for example closing the switches 7-312 and 7-314, or connected into the respective energy supply branch 3, for example closing the switches 7-312 and 7-313.

The total output voltages of the energy supply branches 3-1 to 3-3 are determined by the respective switching state of the controllable switching elements 7 of the coupling units 6 and can be adjusted in steps. This stepwise adjustment results depending on the voltage of the individual energy storage modules 4. If the preferred embodiment of identically configured energy storage modules 4 is used as a basis, a maximum possible total output voltage results from the voltage of an individual energy storage module 4 times the number m of energy storage modules 4 which are connected in series per energy supply branch 3.

The coupling units 6 therefore make it possible to connect the phases U, V and W of the electrical machine 1 either to a high reference potential or to a low reference potential and to this extent can also perform the function of a known inverter. Thus, the power and mode of operation of the electrical machine 1 can be controlled by the controllable energy store 2 given suitable actuation of the coupling units 6. The controllable energy store 2 therefore performs a dual function to this extent since it is used firstly for electrical energy supply and secondly also for controlling the electrical machine 1.

The electrical machine 1 has stator windings 8-U, 8-V and 8-W, which are connected to one another in star in a known manner.

In the exemplary embodiment illustrated, the electrical machine 1 is in the form of a three-phase AC machine but can also have less than or more than three phases. The number of energy supply branches 3 in the controllable energy store 2 is naturally also dependent on the number of phases of the electrical machine.

In the exemplary embodiment illustrated, each energy storage module 4 has in each case a plurality of series-connected energy storage cells 5. However, the energy storage modules 4 can also alternatively each have only one single energy storage cell or else parallel-connected energy storage cells.

In the exemplary embodiment illustrated, the coupling units 6 are each formed by four controllable switching elements 7 in the form of a full bridge, which also provides the possibility of a voltage reversal at the output of the energy storage module. However, the coupling units 6 can also be realized by more or less controllable switching elements as long as the required functions (bypassing of the energy supply cells and connection of the energy supply cells into the energy supply branch) can be realized.

In order to make it possible to charge energy storage cells 5 of one or more energy storage modules 4, according to the illustrated embodiment of the invention, a secondary side of a charging transformer 10 is connected, at one end, to a star point S of the electrical machine 1 and, at the other end, to the reference rail T-.

On the primary side, a switching unit 11, for example in the form of a half or full bridge, is connected upstream of the charging transformer 10, which switching unit connects the primary side of the charging transformer 10 to an AC voltage source 12.

An AC voltage is present at a secondary winding 9 of the charging transformer 10, which voltage must be rectified in order to be able to be used as a charging voltage for one or more energy storage cells 5 of the controllable energy store 2. Using the coupling units 6 of the controllable energy store 2, which coupling units are configured in full-bridge topology, it is now possible to realize the rectifier function without a separate rectifier unit. For this purpose, the energy storage cells 5 to be charged are connected into the respective energy supply branch 3 by means of corresponding control of the switching elements 7 of the respectively associated coupling unit 6 with the respective polarity, so that they are charged.

In order to charge the energy storage cells 5, charging inductances are also required, which are formed by the motor windings 8-U, 8-V and 8-W if the charging transformer 10 is connected via the star point S of the electrical machine 1. If the inductances of the motor windings 8-U, 8-V and 8-W are insufficient, a charging inductance (not illustrated) can be connected between the secondary side of the charging transformer 10 and the electrical machine 1.

A voltage $U_L$ across a motor winding 8-U, 8-V, 8-W appears as the difference between a secondary voltage $U_{sec}$ on the secondary side of the charging transformer 10 and a string voltage $U_{branch1}$ or $U_{branch2}$ or $U_{branch3}$ at the respectively associated energy supply branch 3-1 or 3-2 or 3-3. The charging of the energy storage cells 5 takes place in two stages.

In a current increase stage, the voltage $U_L$ must be positive ($U_L > 0$) in order to store charging energy in the respective charging inductance in the form of the respective motor winding 8. This can be achieved by a voltage which is smaller in terms of magnitude than the secondary voltage $U_{sec}$ being set at the respective energy supply branch 3 ($|U_{branch}| < |U_{sec}|$). The string voltage $U_{branch}$ is dependent on the number of energy storage cells 5 connected in the respective energy supply branch 3 and can therefore be actively influenced by targeted connection and/or disconnection of energy storage cells 5 using the coupling units 6. In this case, the gradient of the charging current can also be controlled by the respectively set string voltage $U_{branch}$.

In order not to let the charging current rise indefinitely, a current reduction stage, in which the voltage $U_L$ is negative ($U_L < 0$), follows the current increase stage with the result that the energy stored in the respective motor winding 8 can be emitted again. This can be achieved by a voltage which is greater in terms of magnitude than the secondary voltage $U_{sec}$ being set at the respective energy supply branch 3 ($|U_{branch}| > |U_{sec}|$) Again, this voltage ratio is also set by targeted connection and/or disconnection of energy storage cells 5 using the coupling units 6.

In this way, a constant charging current results during both stages, that is, the current increase stage and the current reduction stage.

Undesired moments during the charging process can be avoided by the electrical machine 1 being mechanically blocked during the charging process, for example using a transmission pawl. Alternatively, the rotor position of the electrical machine 1 can be monitored, for example using an appropriate sensor system, and can be disconnected in the event of a detected rotor movement.

The invention claimed is:

1. A system for charging at least one energy storage cell in a controllable energy store which is used to control and supply electrical energy to an electrical machine having a defined number of phases, where the defined number is greater than or equal to one, wherein
  the controllable energy store has a number of parallel energy supply branches, wherein the number of parallel energy supply branches is equal to the defined number of phases, which
    have in each case at least two energy storage modules, which are connected in series and comprise in each case at least one electrical energy storage cell having an associated controllable coupling unit,
    are switchably connected on one side to a reference rail and
    are switchably connected on the other side to in each case one phase of the electrical machine,
  the coupling units are configured as full bridges and, depending on control signals, bypass the respectively associated energy storage cells or connect the respectively associated energy storage cells into the respective energy supply branch, and the coupling units further configured to
    in a current increase stage in the energy supply branches, set a voltage which is smaller in terms of magnitude than that at the secondary side of the charging transformer based on the control signals, and
    in a current reduction stage following the current increase stage in the energy supply branches, set a voltage which is greater in terms of magnitude than that at the secondary side of the charging transformer based on the control signals, and
  a star point of the electrical machine connected to each of the parallel energy supply branches and the reference rail connected to a secondary side of a charging transformer.

2. The system as claimed in claim 1, wherein an additional charging inductance can be connected between the secondary side of the charging transformer and the star point of the electrical machine.

* * * * *